United States Patent
Blackwell-Thompson et al.

(10) Patent No.: US 7,093,805 B2
(45) Date of Patent: Aug. 22, 2006

(54) SYSTEM AND METHODS FOR INTEGRATING A PAYLOAD WITH A LAUNCH VEHICLE

(75) Inventors: Judith C. Blackwell-Thompson, Merritt Island, FL (US); John A. Graves, Titusville, FL (US); Anita E. Gale, Nassau Bay, TX (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/730,566

(22) Filed: Dec. 8, 2003

(65) Prior Publication Data
US 2004/0245399 A1    Dec. 9, 2004

Related U.S. Application Data

(62) Division of application No. 10/201,620, filed on Jul. 23, 2002, now Pat. No. 6,845,949.

(51) Int. Cl.
*B64G 1/22*    (2006.01)
(52) U.S. Cl. .................................................. 244/173.1
(58) Field of Classification Search ............ 244/158 R, 244/118.1, 161, 137.1
See application file for complete search history.

(56) References Cited

U.S. PATENT DOCUMENTS

| | | | |
|---|---|---|---|
| 4,044,974 A | 8/1977 | Lingley et al. | 244/161 |
| 4,290,570 A * | 9/1981 | Smolik et al. | 244/158 R |
| 4,324,374 A | 4/1982 | Wittmann et al. | 244/158 R |
| 4,711,417 A * | 12/1987 | Steffy | 244/158 R |
| 4,771,971 A | 9/1988 | Ludwig et al. | 244/158 R |
| 4,776,539 A | 10/1988 | Byers et al. | 244/158 R |
| 4,789,118 A | 12/1988 | Byers | 244/158 R |
| 5,848,766 A | 12/1998 | Thompson | 244/158 R |

OTHER PUBLICATIONS

CCT Project Spotlight, *Command and Control Technologies Corporation*; http://www.ptvs.cctcorp.com; Apr. 2001; 2 pgs.
http://science.ksc.nasa.gov/shuttle/technology/sts-newsref/spacelab.html; 15 pgs; Information content from the NSTS Shuttle Reference Manual (1988) Last Hypertexed Thursday Aug. 31, 2000.

* cited by examiner

*Primary Examiner*—Tien Dinh
(74) *Attorney, Agent, or Firm*—Harness Dickey & Pierce P.L.C.

(57) ABSTRACT

A system for providing an interface between a launch vehicle and a payload of the launch vehicle includes payload integration points of the launch vehicle that remain unchanged relative to different payload configurations, such that a payload is configurable apart from the launch vehicle. The system makes it possible to de-couple payload installation and launch vehicle turnaround operations. Payloads can be configured off-line from launch vehicle processing, thus making it possible to accommodate unique payloads while reducing wear and tear on the launch vehicle.

20 Claims, 9 Drawing Sheets

SYSTEM AND METHODS FOR INTEGRATING A PAYLOAD WITH A LAUNCH VEHICLE

CROSS-REFERENCE TO RELATED APPLICATIONS

This application is a divisional of U.S. patent application Ser. No. 10/201,620 filed on Jul. 23, 2002, now U.S. Pat. No. 6,845,969.

FIELD OF THE INVENTION

The present invention relates to launch vehicle payloads and, more particularly, to processing a payload for integration with a launch vehicle for flight.

BACKGROUND OF THE INVENTION

Payloads carried aboard launch vehicles can vary widely as to size, function and system requirements. For example, a space shuttle orbiter of the National Space Transportation System (NSTS) can be equipped to carry, in its payload bay, configurations of Spacelab, developed by the National Aeronautics and Space Administration (NASA) and the European Space Agency (ESA). Spacelab is modularly configured and can be varied to meet specific mission requirements. Spacelab can include a pressurized module containing a laboratory, one or more open pallets that expose materials and equipment to space, a tunnel for accessing the pressurized module, and/or an instrument pointing subsystem. An orbiter payload also could include, for example, one or more deployable spacecraft and/or small self-contained payloads known as "getaway specials".

A payload typically utilizes a high percentage of limited launch vehicle capability and resources, e.g. weight, payload bay and/or fairing volume, avionics and/or power. Launch vehicle resource allocation and payload integration are complicated by the fact that launch vehicle customers frequently have unusual individual needs for payload services such as power, monitoring/commanding, attitude/pointing, contamination control, fluid services and active cooling. Thus preparing a payload for flight and for integration with a launch vehicle usually is a lengthy and complicated process.

For most missions, payload requirements are accommodated by reconfiguring the launch vehicle payload bay. Avionics, software and other systems also are reconfigured in accordance with new payload configurations and requirements. Detailed compatibility analyses are commonly performed to ensure that the reconfigured systems function as needed for both launch vehicle and payload(s).

Payloads for space shuttle flights are processed through a series of facilities and testing procedures, and launch vehicle modifications also are subjected to testing. It typically becomes necessary to reconfigure payload ground handling equipment at one or more payload processing facilities. Additionally, small non-deployable payloads that are to be mounted on a payload bay sidewall cannot be installed until relatively late in the integration process. Thus the time required to integrate a payload with a launch vehicle can be lengthy and subject to change. It would be desirable to eliminate the need to reconfigure a payload bay and ground handling equipment for each launch vehicle flight. It also would be desirable to reduce payload integration costs and timelines.

SUMMARY OF THE INVENTION

The present invention, in one preferred embodiment, is directed to an interface system for providing an interface between a launch vehicle and a payload of the launch vehicle. The interface system includes a plurality of payload integration points of the launch vehicle that remain unchanged relative to different payload configurations, such that a payload is configurable apart from the launch vehicle.

The above system makes it possible to de-couple payload installation and launch vehicle turnaround operations. Payload configuration can be performed off-line from launch vehicle processing, thus making it possible to accommodate unique payloads while reducing wear and tear on the launch vehicle. Launch vehicle operations can be improved while payload-unique integration services can be provided efficiently, thus benefiting both launch vehicles and their payloads.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Although embodiments of the present invention are described with reference to a reusable launch vehicle, the invention is not so limited. Embodiments also are contemplated for use in non-reusable or expendable launch vehicles. Additionally, embodiments are described herein relative to launch vehicle and payload avionics, mechanical and software systems. It is to be noted, however, that embodiments also are contemplated relative to any launch vehicle system or subsystem that can be configured so as to present a launch vehicle standard interface for payload integration.

Figure 1:
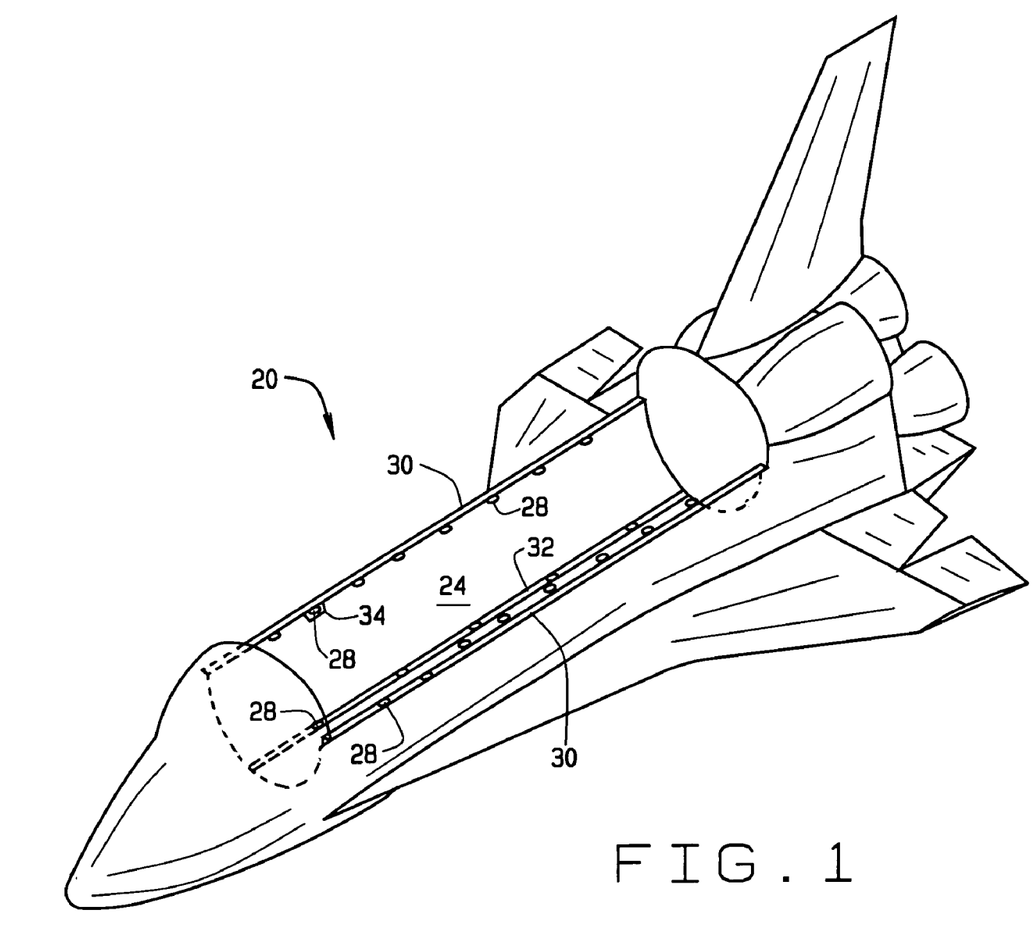
FIG. 1 is a perspective view of a reusable launch vehicle.

A reusable launch vehicle is indicated generally by reference number 20 in FIG. 1. The vehicle 20 shown in FIG. 1 is generally referred to as a space shuttle orbiter. The vehicle 20 is designed for launch into space via solid rocket boosters and a fuel tank which are jettisoned after launch. The vehicle is equipped to carry various types of payloads into orbit around the earth and to deploy and/or retrieve payloads, e.g., satellites and/or other spacecraft. The vehicle 20 is further documented in the NSTS Shuttle Reference Manual (1988), available from the National Aeronautics and Space Administration (NASA).

Payloads are secured in a launch vehicle payload bay 24. Payloads can be secured in the bay 24 at attachment points 28 regularly spaced along two side longerons 30 and along a centerline keel 32. Non-deployable payloads can be secured at the attachment points 28 by passive retention devices or latches 34. Deployable payloads are secured by motor-driven, active retention devices or latches (not shown in FIG. 1). The payload retention devices allow installation and removal of payloads when the launch vehicle 20 is positioned horizontally or vertically. The payload bay 24 is enclosed during flight by a pair of payload bay doors (not shown) which are opened for deployment of payload(s) into space.

Figure 2:
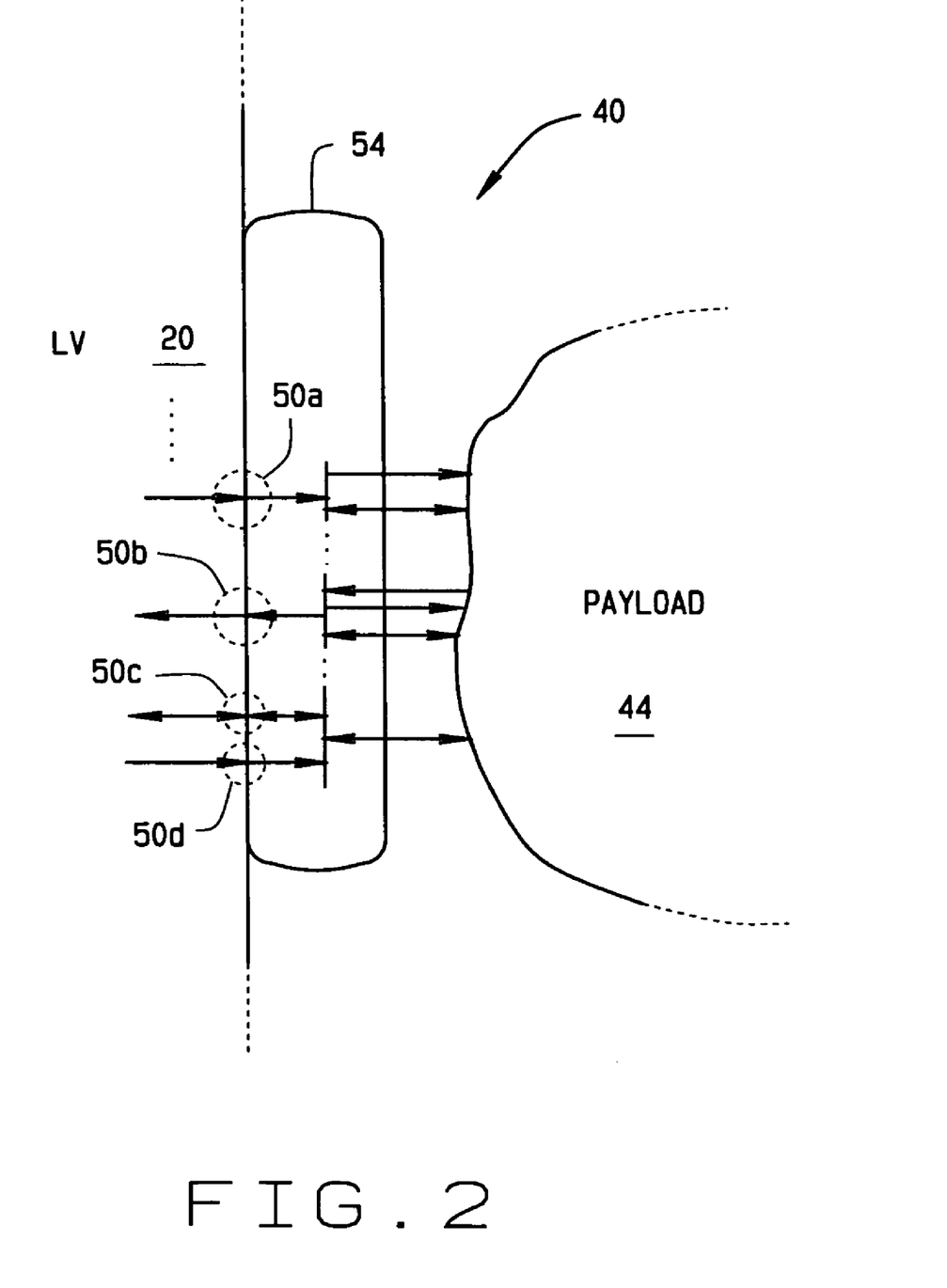
FIG. 2 is a diagram of an interface system according to one embodiment of the present invention.

An interface system according to one embodiment of the present invention is indicated generally by reference number 40 in FIG. 2. The interface system 40 provides an interface between the launch vehicle 20 and a payload 44 of the launch vehicle. The payload 44 can include deployable and/or non-deployable payloads in various configurations, and for which needs and requirements relative to systems of the launch vehicle 20 can be unique to a particular flight mission. For example, a particular payload can require power, monitoring/commanding, attitude/pointing, contamination control, fluid services and/or active cooling.

The interface system 40 includes a plurality of payload integration points 50 of the launch vehicle 20. For example, integration points 50a through 50d are shown in FIG. 2. As shall be described in greater detail below, the payload integration points 50 of the launch vehicle 20 remain unchanged relative to different payload configurations, such that a payload is configurable apart from the launch vehicle 20. That is, the payload 44 is assembled and/or configured relative to the integration points 50, but the launch vehicle 20 is not reconfigured relative to the payload 44.

At least one interface element 54 is configurable to interface with the payload configuration 44 and with at least one of the launch vehicle payload integration points 50. As shall be described in greater detail below, an interface element 54 is configurable with the payload 44 apart from the launch vehicle 20. That is, the interface element 54 is configured with the payload 44 relative to the integration points 50, but the launch vehicle 20 is not reconfigured relative to the interface element 54.

The payload integration points 50 of the launch vehicle 20 can include, for example, a plurality of avionics system integration points. An exemplary embodiment of an interface system shall now be described with reference to a launch vehicle avionics system, indicated generally by reference number 100 in FIG. 3. The system 100 includes elements (not shown) located in a launch processing system control room and avionics system elements 108 located aboard the launch vehicle 20.

The elements 108 interface with a payload (not shown in FIG. 3) at avionics system integration points as further described below. Elements 108 include an aft-flight-deck standard switch panel (SSP (AFD)) 158, a payload interrogator (PI) 160, a payload signal processor (PSP) 162, payload forward multiplexer/demultiplexers (MDMs PF1 and PF2) 164, a payload data interleaver (PDI) 166, a pulse code modulation master unit (PCMMU) 168, and an operational instrumentation multiplexer/demultiplexer (OI/MDM) 170.

Figure 3:
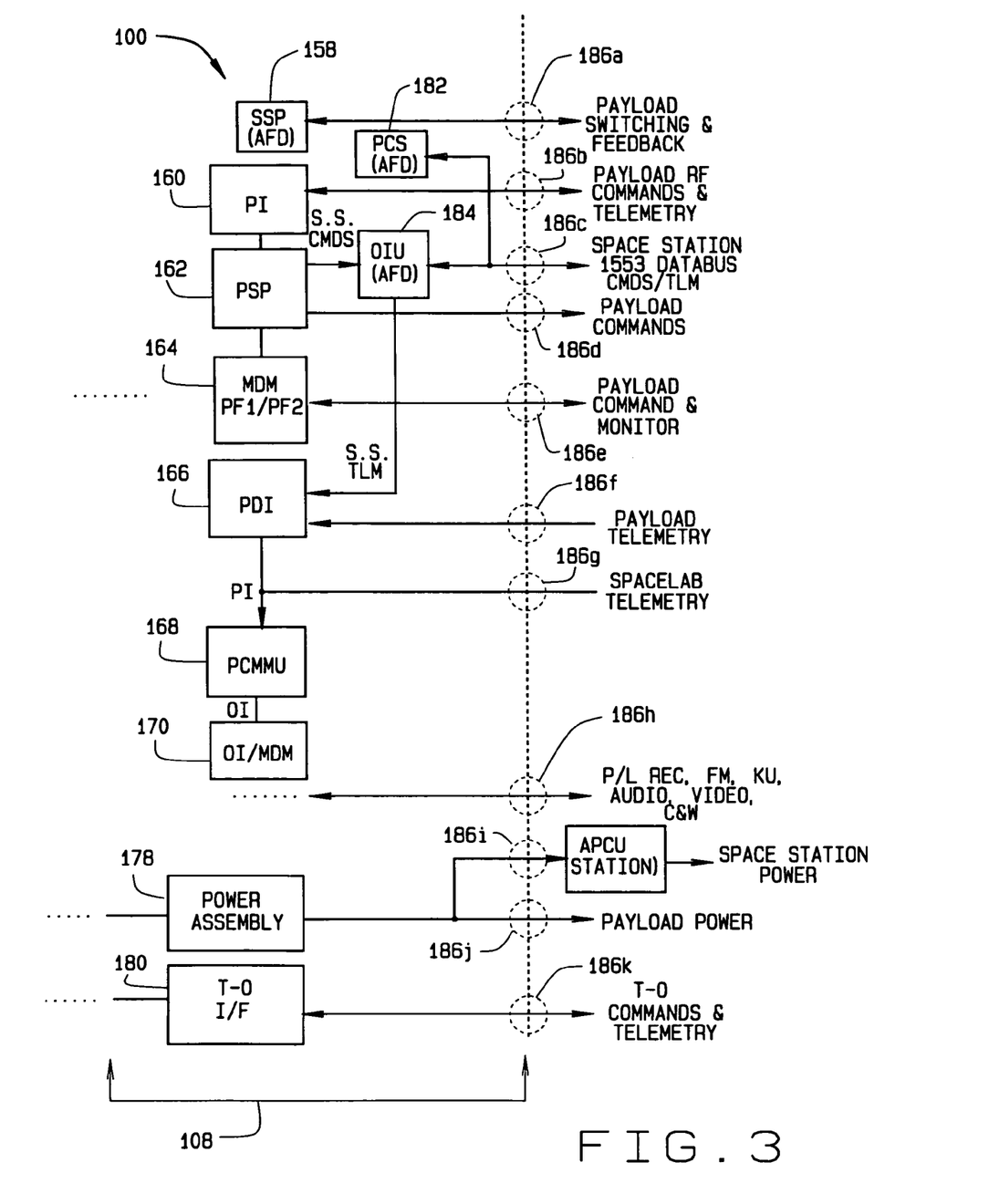
FIG. 3 is a diagram of a launch vehicle avionics system according to one embodiment of the present invention.

The elements 108 also include a power assembly 178 and a T-0 interface (T-0 I/F) 180. A portable computer system (PCS) 182 in the aft deck (AFD) (not shown) of the vehicle 20 is used to support International Space Station (ISS) control and monitor functions. An orbiter interface unit (OIU) 184 translates space shuttle control and monitor functions to ISS protocol and vice-versa.

For each flight of the vehicle 20, services provided by such elements as the PSP162, PI 160, PDI 166, MDM 164, OIU 184, and SSP 158 are reconfigured to support the flight. For example, mission-unique software updates and installation and/or removal of cable and equipment are performed for each flight. It should be noted, however, that the launch vehicle avionics system 100 includes a plurality of payload integration points 186 for integrating a payload with the launch vehicle avionics system 100.

Integration point 186a is in communication with the aft-flight-deck standard switch panel 158 and accommodates payload switching and feedback. Integration point 186b is in communication with the payload interrogator 160 and accommodates payload RF commands and telemetry. Integration point 186c communicates with the PCS (AFD) 182 and the OIU (AFD) 184. The point 186c accommodates space station communication, a 1553 databus, and commands and telemetry. Integration point 186d makes available payload commands from the payload signal processor 162. Integration point 186e accommodates payload commands and monitoring via the MDM 164.

Integration point 186f accommodates telemetry delivery from a payload to the payload data interleaver 166. Integration point 186g accommodates delivery of Spacelab telemetry to the PCMMU 168. Integration point 186h accommodates payload recording, FM, Ku, audio, video, and caution and warning (C&W) transmissions. Integration points 186i and 186j make power from the power assembly 178 available respectively to a space station power converter unit (APCU) 188 and a payload. Integration point 186k accommodates T-0 commands and telemetry between a payload and the T-0 interface 180.

The integration points 186 are accessible, for example, in the payload bay 24 of the launch vehicle 20 and are standardized. That is, the integration points 186 remain unchanged relative to different payload configurations, such that, with respect to avionics, a payload is configurable apart from the launch vehicle 20. Thus any avionics functionality specified for a particular payload would be configured so as to interface with the integration points 186. For example, the integration points 186 provide standardized allocations of command, power and monitor services from the launch vehicle 20. Such services can be translated and reallocated to individual payloads based on particular payload requirements.

Generally, it can be useful to provide an interface element 54 (shown in FIG. 2) that is configurable to interface with a particular payload configuration and also with at least one launch vehicle payload integration point. For example, an embodiment of a payload carrier is indicated generally by reference number 200 in FIG. 4. The carrier 200 is modular and can be configured to carry a single payload or a plurality of payloads. Such payload(s) can be deployable and/or non-deployable. The carrier is described in greater detail in a co-pending U.S. patent application entitled "Launch Vehicle Payload Carrier and Related Methods", the disclosure of which is incorporated herein by reference in its entirety.

Figure 4:
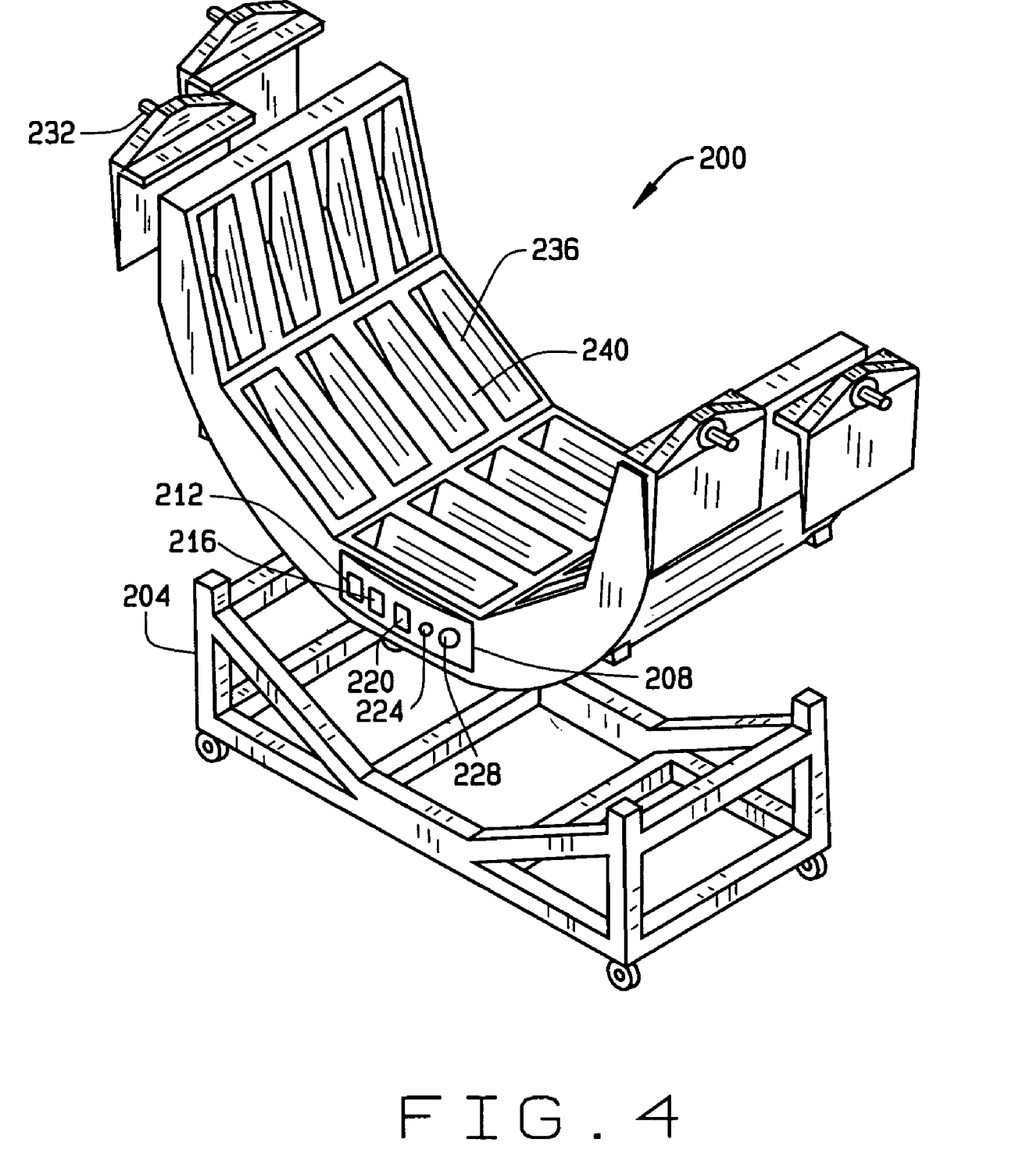
FIG. 4 is a perspective view of a first embodiment of a payload carrier.

The carrier 200 can be configured with a payload, for example, while resting in a support fixture 204 apart from the launch vehicle 20. The carrier 200 can be transported to more than one facility for various stages of payload assembly and testing and eventually is transported, with its payload, to a launch site for integration with the launch vehicle 20.

The carrier 200 includes an avionics system, indicated conceptually as a panel 208 in FIG. 4. The avionics system 208 provides avionics services to payload(s) installed in the carrier 200. The system 208 includes a carrier command unit (CCU) 212 that supports launch vehicle command and telemetry protocols, including but not limited to PCM, 1553, ISP and Ethernet. The CCU 212 includes a MIL-STD 1553 poll response data bus 224. The system 208 also includes a carrier data management unit (CDMU) 216, a carrier power distribution unit (CPDU) 220, and a dedicated payload signal processor umbilical 228. Other configurations of the avionics system 208 are contemplated that provide distribution and management of avionics services relative to the payload(s).

The avionics system 208 interfaces with the vehicle avionics integration points 186. Command and data formats used in the launch vehicle 20 are translated by the avionics system 208 into command and data formats used for payloads in the carrier 200, and vice-versa, so that launch vehicle command and data formats can remain unchanged between missions.

Figure 5:
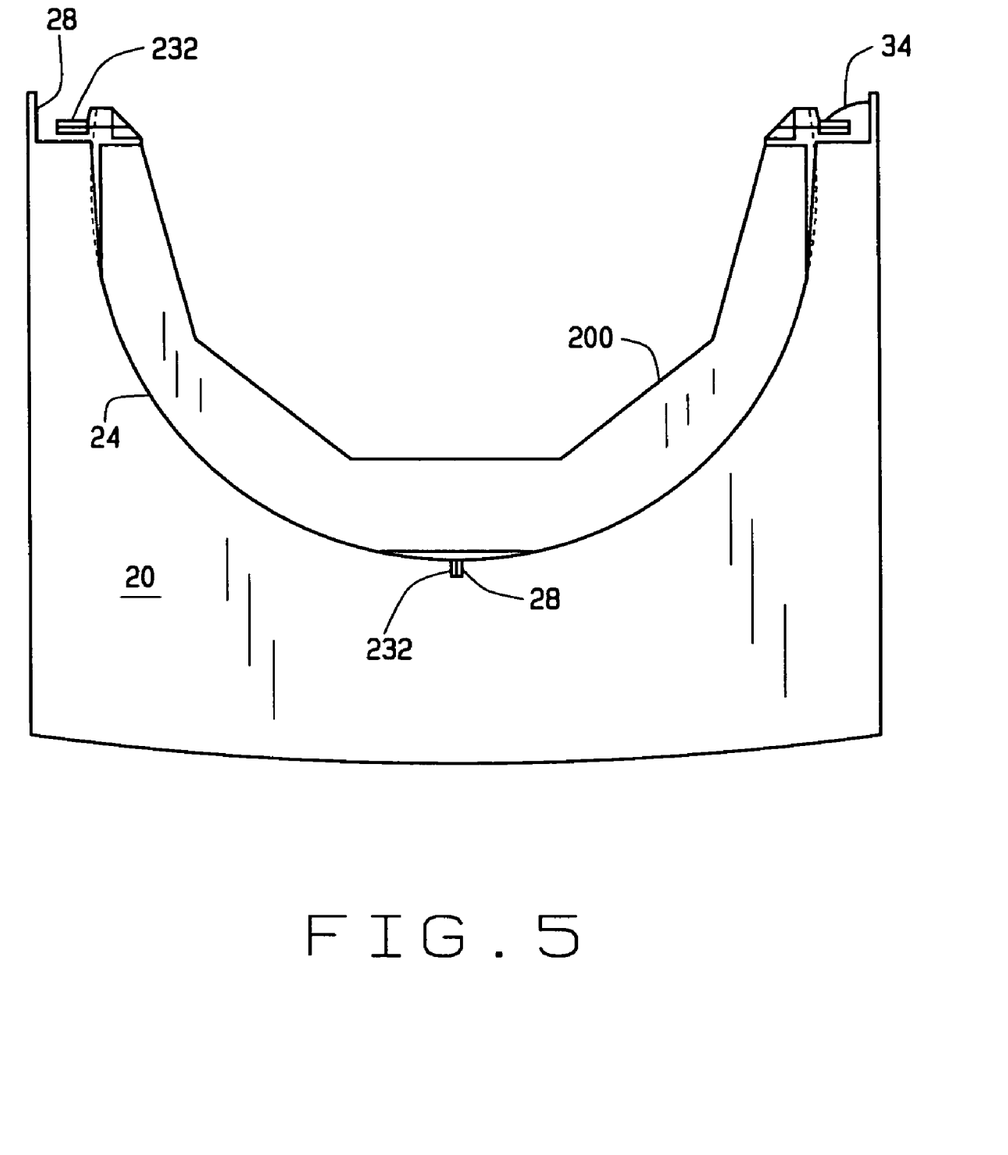
FIG. 5 is a frontal view of the payload carrier installed in a launch vehicle payload bay.

The payload carrier 200 can serve as an interface element 54, not only relative to avionics integration points 186 (shown in FIG. 3), but also relative to mechanical, fluid and other integration points of the launch vehicle 20. For example, as shown in FIGS. 4 and 5, the carrier 200 includes a plurality of trunnions 232 that can be moved laterally and/or longitudinally relative to the carrier 200. Thus the trunnions 232 can be positioned to interface with standard payload bay attachment points 28 (shown in FIG. 1) and are latched into the attachment points via standard passive payload bay latches 34.

Referring to FIG. 4, a plurality of compartments 236 are defined within the carrier 200 and are accessible via an inner surface 240 of the carrier. The compartments 236 are sized to accommodate standard "getaway special" experiment containers (not shown). Such containers thus can be integrated, along with other payloads, into the carrier 200, apart from the launch vehicle 20.

Figure 6:
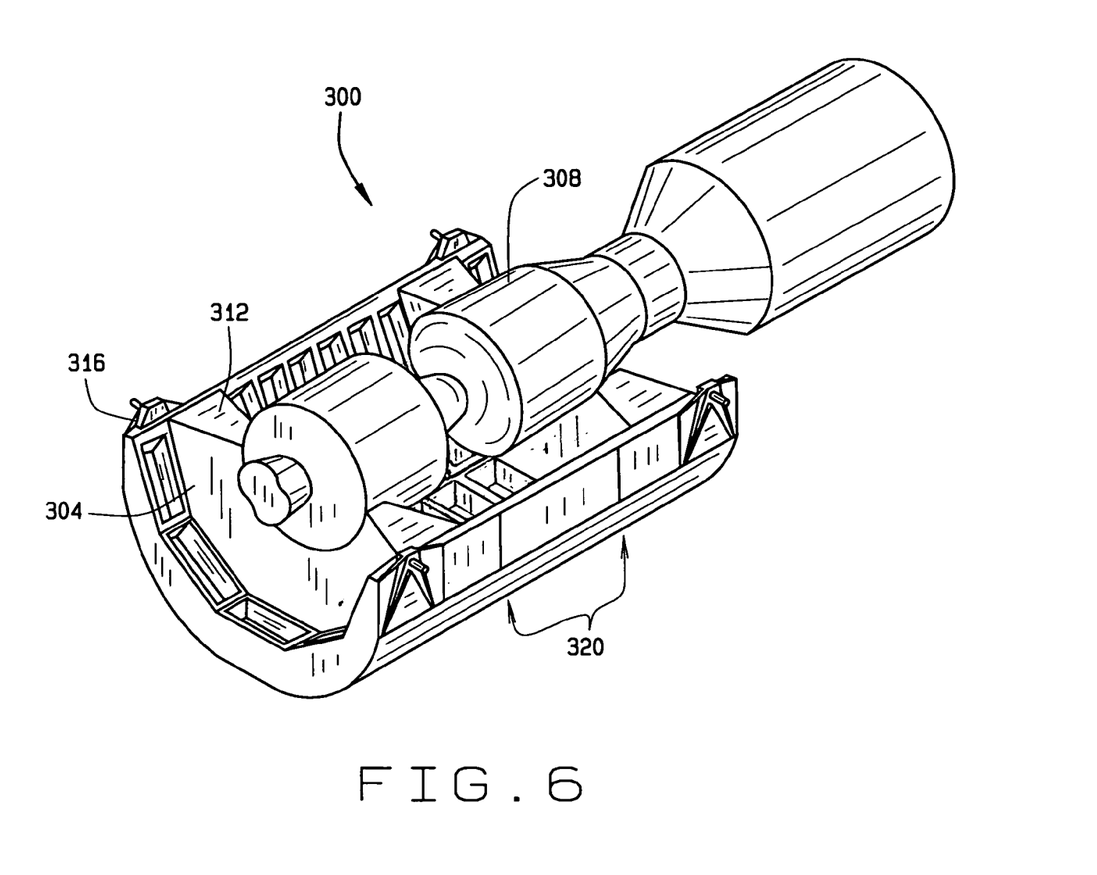
FIG. 6 is a perspective view of a second embodiment of a payload carrier.

A second embodiment of a carrier is indicated generally by reference number 300 in FIG. 6. The carrier 300 can be configured with removable bulkheads 304 of appropriate size and in sufficient number to support a deployable payload 308. The payload 308 is secured by latch assemblies 312 attached to the bulkheads 304 and to trunnions 316. The payload 308 can be deployed using a launch vehicle standard remote manipulator system (RMS) (not shown). The payload carrier 300 includes at least one module 320, a plurality of which can be joined together as shown in FIG. 6. The carrier 300 can accommodate different-sized and different-shaped deployable and/or non-deployable payloads via different module and bulkhead arrangements.

It should be noted that it can be useful, but not necessary, to utilize a payload carrier as described above in order to configure a payload to interface with the integration points 186. For example, where an unusually large payload does not fit in a payload carrier, avionics services within the payload could be configured so as to interface directly with the integration points 186.

Figure 7:
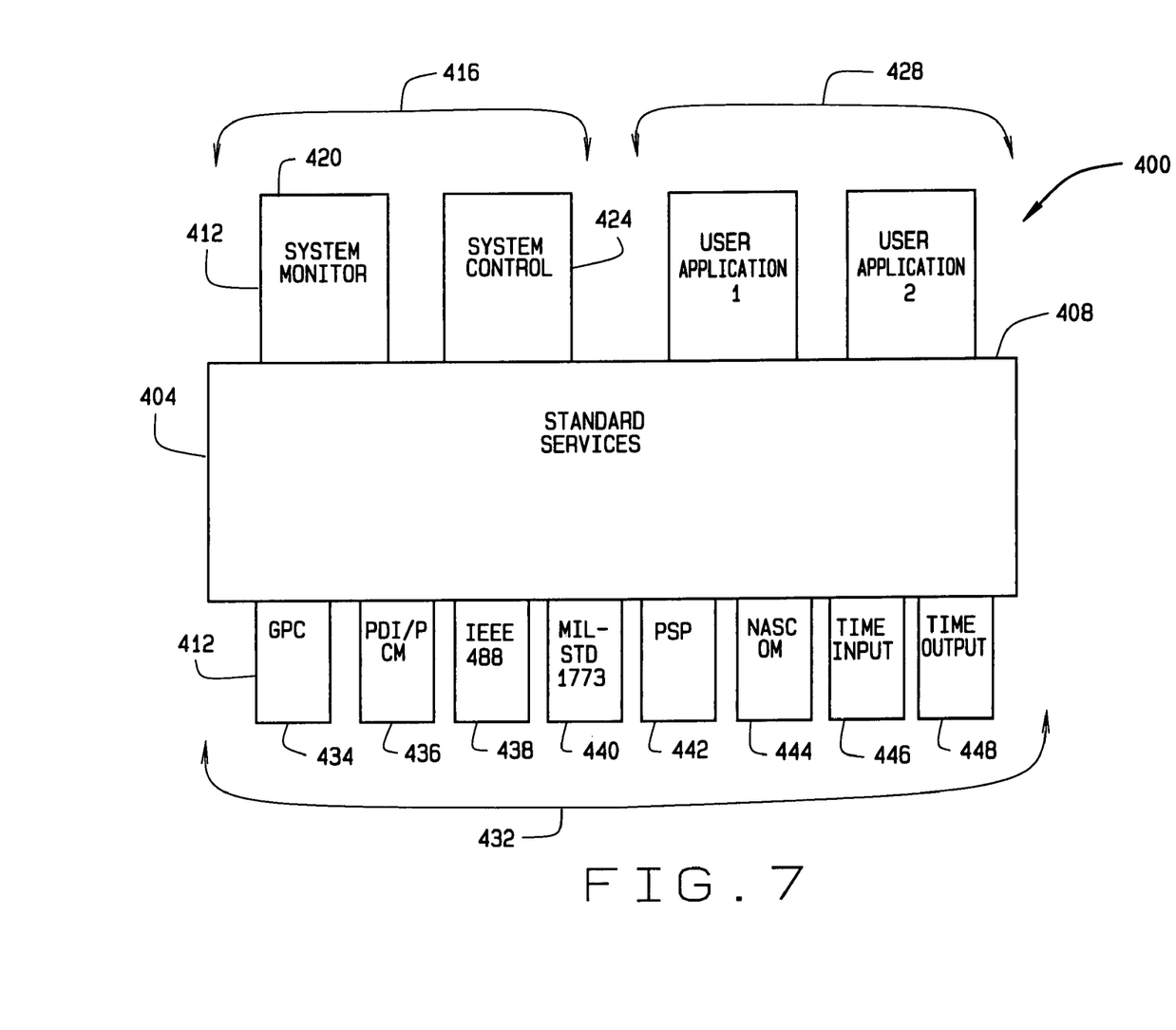
FIG. 7 is a diagram of an object-oriented software system according to one embodiment of the present invention.

The launch vehicle 20 also includes an object-oriented software system indicated generally by reference number 400 in FIG. 7. The system 400 provides a standard set of payload software services 404 that remain unchanged relative to different payload software configurations. Standard payload avionics software services can include, but are not limited to, support for power bus interface, APCU power interface, payload data interleaver interface, OIU/payload signal processor (PSP) interface, GPC command interface, multifunction CRT display system (MCDS) interface, FM, MDM, Ku, PI and system signal processor (SSP) interfaces, and caution and warning interfaces.

The software system 400 includes at least one payload software integration point, a plurality of which are indicated conceptually in FIG. 7 by a border 408 surrounding standard services 404. At least one interface element, e.g. a front-end software module 412, can, for example, be invoked by standard services software 404. Modules 412 can include system applications 416 such as system monitor 420 and system control 424, user applications 428, and end-item interface applications 432, e.g., for GPC 434, PDI/P CM 436, IEEE 488 438, MIL-STD-1773 440, PSP 442, NASC OM 444, and time input and output 446 and 488. A non-standard payload-specific application can be designed as one or more software objects to be included in the front-end modules 412, for example, at launch facility payload integration.

Figure 8:
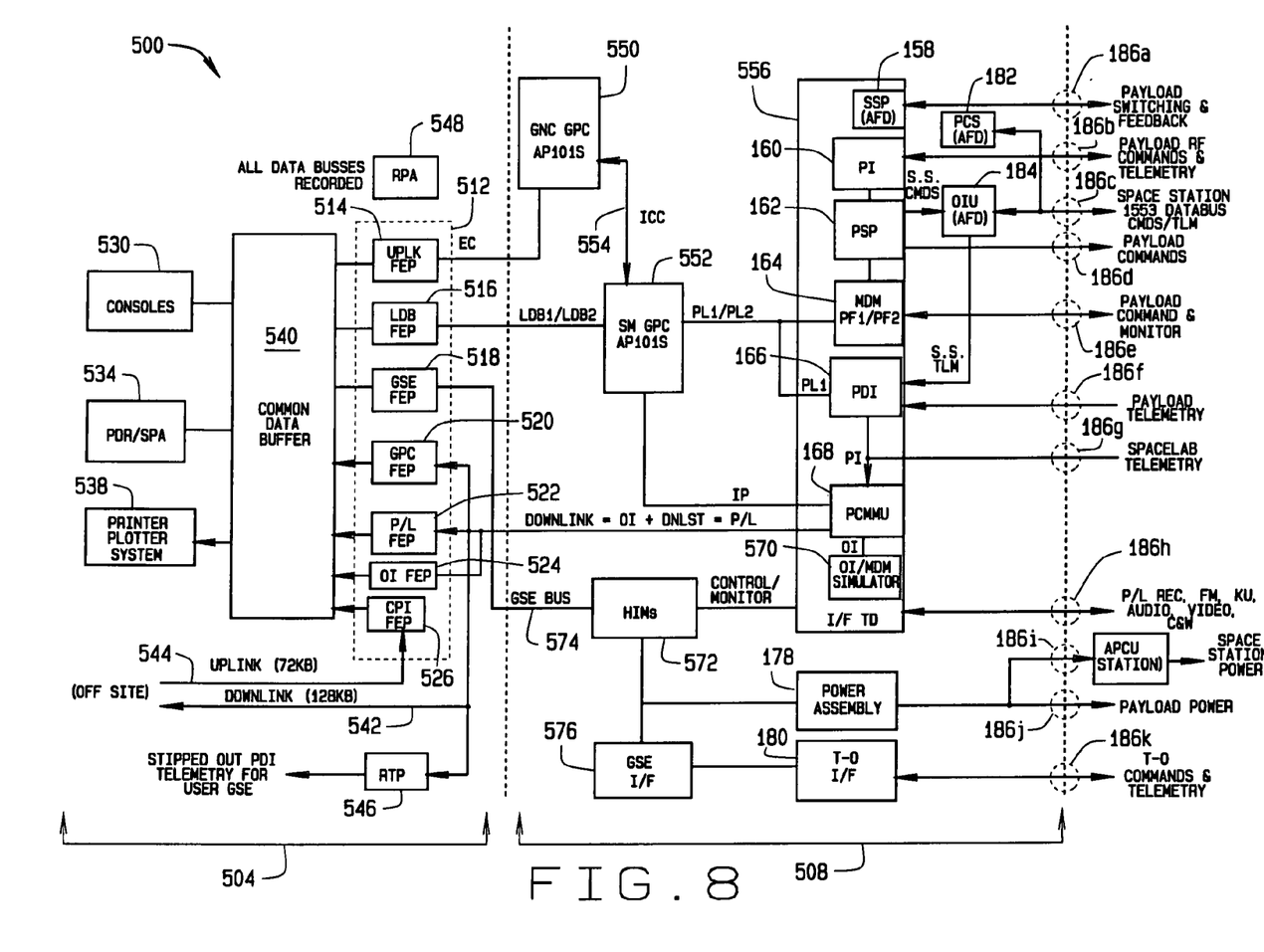
FIG. 8 is a diagram of a launch vehicle avionics checkout system.

An exemplary embodiment of an interface system shall now be described with reference to a launch vehicle avionics checkout system, indicated generally by reference number 500 in FIG. 8. The system 500 is used to verify operation of launch vehicle systems prior to a launch. The system 500 includes and/or is compatible with elements 504 located in a launch processing system control room. The system 500 also includes and/or is compatible with avionics system elements 508 located aboard the launch vehicle 20.

The elements 508 interface with a payload (not shown in FIG. 8) at avionics system integration points as further described below. Generally, it should be noted that embodiments of the present invention are contemplated for use with other systems besides the checkout system 500, including but not limited to launch vehicle avionics and/or protocols currently in use. Embodiments are contemplated, for example, for use with CLCS (Checkout and Launch Control System), CSS (Cargo Support System), and avionics protocols such as Ethernet.

Control room elements 504 include a plurality of front-end processors (FEPs) 512, for example, an uplink (UPLK) FEP 514, a launch data bus (LDB) FEP 516, a ground support equipment (GSE) FEP 518, a general-purpose computer (GPC) FEP 520, a payload (P/L) FEP 522, an operational instrumentation (OI) FEP 524, and a Cite-POCC (Cargo Integration Test Equipment-Payload Operations Control Center) interface (CPI) FEP 526.

The FEPs 512 interface with consoles 530, a processed data recorder/signal processor assembly 534 and a printer/plotter system 538 via a common data buffer 540. Communication with an off-site launch area is provided via downlink 542 and uplink 544 satellite transmission. Payload data interleaver (PDI) telemetry can be made available to off-site payload user ground support equipment (GSE) via a retransmission processor (RTP) 546. A record and playback assembly (RPA) 548 records data bus information received from the launch vehicle 20.

Elements 508 of the avionics system 500 located on the launch vehicle 20 include and/or are compatible with launch vehicle avionics elements previously described with reference to FIG. 3. The avionics elements 508 also include a guidance, navigation and control general purpose computer (GNC GPC) simulator 550 that receives flight control information. The GNC computer simulator 550 communicates with a systems management general purpose computer (SM GPC) 552 via an inter-computer channel (ICC) 554. The SM computer 552 communicates, via launch data buses LDB1 and LDB2, with the launch data bus front-end processor 516.

A TD interface (I/F TD) 556 transfers information between the launch vehicle 20 and its payload(s) as further described below. The TD interface 556 interfaces with the aft-flight-deck standard switch panel (SSP (AFD)) 158, payload interrogator (PI) 160, payload signal processor (PSP) 162, multiplexer/demultiplexers (MDMs PF1 and PF2) 164, payload data interleaver (PDI) 166, pulse code modulation master unit (PCMMU) 168, and an operational instrumentation multiplexer/demultiplexer (OI/MDM) simulator 570.

The TD interface 556 interfaces with hardware interface modules (HIMs) 572. The HIMs 572 communicate with the ground support equipment front-end processor 518 via a GSE bus 574. The HIMs are also in communication with a ground support equipment interface (GSE I/F) 576 and the power assembly 178. The GSE interface 576 is in communication with the T-0 interface (T-0 I/F) 180. It should be noted that the TD interface 556, power assembly 178 and T-0 interface 180 interface with the payload(s) via the payload integration points 186 previously described with reference to FIG. 3.

The above described interface system makes it possible to configure payloads, and to test payload systems, before a payload arrives at a launch site. Payload testing can be performed, for example, using at least one test and verification system that emulates launch vehicle payload integration points 50. Such a system, for example, would emulate the launch vehicle avionics interface points 186 (shown in FIGS. 3 and 8).

Figure 9:
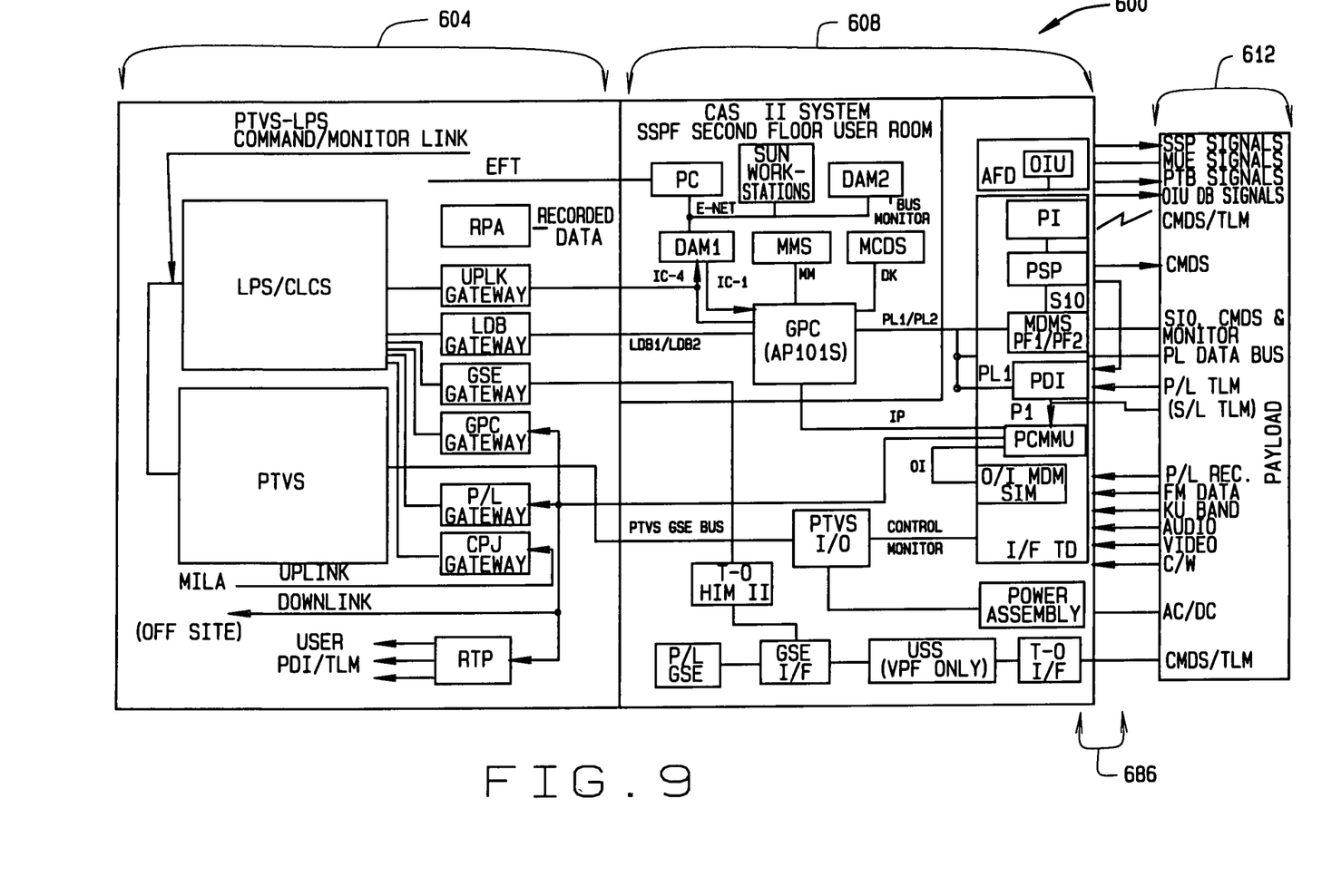
FIG. 9 is a diagram of a payload test and verification system.

An exemplary test and verification system is indicated generally by reference number 600 in FIG. 9. The system 600 supports payload checkout operations from assembly-level tests through LRU (line-replaceable unit) integration. The system 600 emulates vehicle launch conditions with respect to a launch processing system and launch vehicle interfaces. The test system 600 includes control room emulation elements 604 and launch vehicle emulation elements 608 for testing payload avionics system elements 612. The system 600 validates physical interfaces, payload/spacecraft functionality, and command and control of the payload avionics elements 612 by flight software. The system 600 interfaces with the payload elements 612 via payload integration points 686 that allow the payload to be configured apart from the launch vehicle. The system 600 is portable and thus can travel with a payload for testing throughout payload assembly and processing.

It can be seen from the foregoing description that the interface system 40 facilitates payload and launch vehicle configuration and integration in a variety of ways. Standard launch vehicle-payload interfaces can remain identical for all missions, thus eliminating a need to reconfigure a payload bay or launch vehicle between missions. Launch vehicle latches and avionics services can be left in place between missions, and the present payload-to-launch vehicle integration process can be almost completely eliminated.

When an interface element is utilized, it can be uniquely configured to meet unique payload requirements. For example, the above-described payload carrier can be uniquely configured for internal distribution of avionics, power and other services. The carrier can be configured to carry most payloads, and unique configurations for small (sidewall) payloads can be greatly reduced or eliminated. Payload-unique command and control requirements can be met through use of the carrier avionics system.

The above-described interface system facilitates testing and verification of payload systems prior to integration with a launch vehicle. Thus payload system reliability can be increased while the need for payload-specific interface verification and testing of the launch vehicle is greatly reduced. Interface standardization can provide many benefits to payload customers and launch providers alike, for example, more frequent flights and reduced turnaround time. Reduced need for human access to the payload bay of a launch vehicle also reduces chances for collateral launch vehicle damage. The above-described interface system also minimizes exposure of payloads to launch vehicle environments and processing. Customers enjoy greater payload autonomy, and launch team time and costs can be reduced. Ground processing of payloads is simplified, and payload integration templates can be reduced.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for integrating a specific payload with a launch vehicle in preparation for a specific flight, the method comprising:
   making a plurality of standard payload services available via a plurality of standardized payload integration points of the launch vehicle; and
   configuring the specific payload to interface with the standardized integration points through an interface element, the interface element configurable to reallocate a standardized allocation of one or more of the standard payload services among various payloads to be included in the specific flight, to provide one or more mission-specific and payload-specific services to the specific payload, said configuring performed apart from the launch vehicle.

2. The method of claim 1, further comprising configuring the interface element to interface with the specific payload and the standardized launch vehicle integration points.

3. The method of claim 2, wherein configuring the interface element comprises configuring a payload carrier to interface with at least one of an avionics system, a software system, a fluid system and a mechanical system of the launch vehicle.

4. The method of claim 1, further comprising configuring one or more systems of the launch vehicle to provide the standard payload services.

5. The method of claim 1, wherein configuring the specific payload comprises:
   configuring the specific payload to interface with a payload carrier; and
   configuring the payload carrier to interface with the launch vehicle integration points.

6. The method of claim 1, wherein configuring the specific payload comprises configuring at least one of a deployable payload and a non-deployable payload.

7. A method for integrating various payloads with a launch vehicle for a given flight, the method comprising:
   configuring an interface element to interface with the payloads and with a plurality of standardized integration points of the launch vehicle to allow the payloads to interface with a plurality of systems of the launch vehicle for distribution and management of launch vehicle services to each of the various payloads to meet individual mission-specific needs of each of the various payloads;

configuring the payloads to interface with the interface element; and integrating the interface element with the launch vehicle without reconfiguring the launch vehicle.

8. The method of claim 7, further comprising providing via the standardized integration points a plurality of standard payload services by the systems of the launch vehicle.

9. The method of claim 7, further comprising emulating one or more of the standardized integration points of the launch vehicle to test the payloads, the testing performed using a test and verification system.

10. The method of claim 7, wherein the systems of the launch vehicle include an avionics system.

11. The method of claim 10, wherein the interface element includes a payload carrier, and configuring an interface element comprises configuring an avionics system of the carrier to interface with the launch vehicle avionics system.

12. The method of claim 7, further comprising providing at least one of power, monitoring/commanding, attitude/pointing, contamination control, fluid services and active cooling to the payloads via the integration points of the launch vehicle.

13. The method of claim 7, wherein at least one of the payloads is deployable from the launch vehicle.

14. A method for integrating a given payload with a launch vehicle in preparation for a given flight, the method comprising:

standardizing a plurality of integration points of the launch vehicle so that the integration points remain unchanged relative to various payloads and payload configurations;

providing an interface element that can be configured to allocate services available from one or more systems of the launch vehicle via the standardized integration points to meet individual payload-specific and mission-specific needs of various payloads and payload configurations to be included in the given flight, including but not limited to the given payload; and configuring the given payload to interface with the interface element.

15. The method of claim 14, further comprising integrating the interface element with the launch vehicle via the one or more standardized integration points.

16. The method of claim 14, wherein the configuring is performed apart from the launch vehicle.

17. The method of claim 14, wherein providing an interface element comprises providing at least one of a payload carrier and a front-end software module.

18. The method of claim 14, wherein standardizing integration points of the launch vehicle comprises standardizing transmission of at least one of data, fluid and power between the payload and the vehicle.

19. The method of claim 14, further comprising reallocating a standardized allocation of a service from the launch vehicle among a plurality of payloads.

20. The method of claim 19, wherein the reallocating is performed based on requirements of the plurality of payloads.

* * * * *